Patented Aug. 22, 1939

2,170,196

UNITED STATES PATENT OFFICE 2,170,196

METHOD OF STERILIZING FOOD PRODUCTS

George Grindrod, Oconomowoc, Wis.

No Drawing. Application January 15, 1936,
Serial No. 59,221

8 Claims. (Cl. 99—215)

The invention relates to an improved food product and a process of making a new type of food product capable of being indefinitely preserved in hermetically sealed cans.

A typical product of the class herein described is a completely sterile, substantially uncoagulated canned cream soup, containing vegetable material combined with milk, cream, or equivalent substances containing casein, although my invention is not limited in scope to such soups.

One of my objects is to provide means for successfully sterilizing and canning cream soups without objectionable coagulation of the milk content of such soups, and with their qualities, including flavors, substantially unimpaired.

A further and more general object is to provide an improved method for a discontinuous sterilization of liquiform foods generally, whereby the bactericidal effect may be increased beyond the resistance of any bacterial spores heretofore known, and whereby absolute sterility may be attained, even though the final destruction of the spores may be accomplished after the food has been hermetically sealed.

Heretofore attempts to develop the discontinuous or fractional sterilization methods of Pasteur have proceeded upon the theory that because bacteria can be destroyed more readily than their spores, sterilization can be accomplished by destroying the bacteria and then germinating the surviving spores and destroying the bacteria so germinated.

But complete sterility has been rarely attained, and so far as I am aware it has never been attained by any method of discontinuous or fractional sterilization which can be made commercially available in the treatment of products containing milk, cream, or other coagulable substances.

My invention rests in part upon the discovery that by administering a heat shock of sufficient severity to impair the germinating power of the spores and then instantly reducing the temperature, certain reactions will occur, whereby the vitality of the spores will be very materially reduced and their death point lowered to such an extent that by administering a second heat shock before material recuperation has taken place, and before germination has occurred, a complete destruction of the spores may be accomplished. Therefore, it is my object to utilize this discovery and develop a modification of the discontinuous or fractional methods of sterilization of such a character as to allow complete sterilization to be reliably obtained without material impairment of the quality or flavor of the product.

A still further object is to provide for an initial heat treatment of the materials which will stabilize the coagulable material against material coagulation during the succeeding steps of the process.

I will now describe my improved process as I apply it for the purpose of obtaining absolute sterilization of cream soup composed largely of vegetable material in finely divided form, and also containing coagulable material such as milk or cream. Products of this class have heretofore been regarded as impossible to produce without objectionable coagulation and other thermo-chemical changes which seriously impair the commercial value of the product.

As heretofore prepared, canned food products are rarely absolutely sterile. They usually contain unkilled spores, which may not grow readily in the product, but which sometimes grow, with resultant spoilage. In cream soups containing various vegetable material in milk, more spores tend to grow than in less complex substances. These cream soups contain many spores having a thermal resistance considerably in excess of permissible heating by ordinary methods. Thermal resistance as high as 100 minutes at 240 degrees F. are not uncommon, and certain species capable of resisting 160 minutes at 240 degrees F. in non-acid material have been reported. Apparently, some species have even greater resistance, and such spores, if present, grow in great numbers when activated by favorable material.

Objectionable coagulation is increasingly apparent in proportion to the fineness of the subdivision of vegetable material, and therefore it has been customary to confine the manufacture of such soups to products which contain vegetable masses of considerable size, and little, if any, vegetable material which even approaches colloidal size. But even under such circumstances the manufacturers of such cream soups have heretofore found it impossible to produce a successful uncoagulated canned product. Milk, when mixed with vegetables, usually coagulates after about 10 minutes heating at 240 degrees F., and therefore the canned cream soups heretofore produced have always been objectionably coagulated, whereas by my improved process now to be described in detail, absolute sterility is obtainable without objectionable coagulation.

After preparing the desired mixture of finely divided vegetable material and milk, I preferably subject the mixture to an initial heat shock of the character described in my prior Patent No. 1,854,189, dated April 19, 1932, for a Method of stabilizing food products. But in administering this heat shock I prefer to employ the apparatus described in my Reissue Patent No. 19,193, dated June 5, 1934, for improvements in Sterilization of food products.

After administering this initial heat shock I quickly reduce the temperature, as described in said prior patents, and allow the mixture to stand at a temperature materially below the boiling point—preferably at about room temperature—for a period of at least a half hour. This period may be considerably extended, if desired, although it should not be prolonged to a point which would permit germination. The mode of treatment as described in said former patents may be sufficiently severe to prevent germination of certain spores for several hours thereafter, even though the material be held at what would ordinarily be regarded as an incubating temperature.

I then administer a second heat shock of such a character as to almost instantly raise the temperature to about 265 degrees F. or to a temperature near that point ranging between 260 degrees F. and 280 degrees F. The material is exposed to this high temperature for only a few seconds, preferably for considerably less than one minute, and the pressure is then instantly relieved to allow the temperature to drop below the boiling point in open atmosphere. To accomplish this drop in temperature I may discharge the material into a vacuum chamber from which air and water vapor are being continuously withdrawn. When this can be conveniently done, it will be desirable to lower the temperature of the material to about 120 degrees F., thus effectively avoiding thermo-chemical change during the interval of dwell which follows this drop in temperature.

In subjecting the material to the second heat shock as above described, I preferably deliver it upwardly through a tubular sterilizing chamber or passage in a stream of small cross section, into which steam is being continuously injected with sufficient volume, pressure, and temperature to impart to the liquid material a temperature of about 265 degrees F. almost instantaneously. This tubular passage may be provided with suitable baffles for regulating the length of the high temperature interval as described in my companion application Serial No. 17,012, filed April 18, 1935, for Sterilizing apparatus, but any method of heat exchange capable of instantly subjecting the material to an equivalent heat shock may be employed. Such a heat shock is sufficient to kill all bacteria and all spores of low resistance, although it may not directly kill many of the highly resistant spores. Some spores of that character usually pass through the sterilizer with sufficient vitality to germinate, although the shock is sufficiently severe to make germination impossible within a period of several hours. It may be made sufficiently severe to prevent germination within a period of 24 hours or more.

For convenience in description, this second heat shock may be referred to as the major heat shock. The initial heat treatment has dispersion and stabilization for its principal objects, and while it may result in the destruction of vegetative organisms and some spore formers of low resistance, complete sterilization of materials containing highly resistant spore formers may not be expected. The effectiveness of the major heat shock is not dependent upon the initial heat shock for its sterilizing effect, and while it is not essential that complete sterilization be accomplished while the major heat shock is being administered, it is essential that it be of such severity that a material reduction in the death point of surviving spores will follow.

In administering the major heat shock the minimum temperatures permissible will vary in accordance with the resistance of the spores present, whereas the maximum temperature and the duration of the shock beyond the momentary interval above described will be limited by the character of the material, with particular reference to its susceptibility to thermo-chemical change. Ordinarily it will be found that temperatures maintained below 260 degrees F. will be insufficient to bring about the desired subsequent death point reduction, and in a few instances spores have been found to have such high resistance as to require a temperature somewhat above 260 degrees F. in order to obtain a desired degree of death point reduction and thus ensure final attainment of absolute sterility.

In administering the major heat shock as above described, the brevity of the heating interval is such, and the dispersing effect of the steam is so great, that objectionable coagulation may be avoided. This may be true in many cases, even though there has been no initial stabilizing heat treatment.

After administering the major heat shock as above described, the material may be immediately delivered from the sterilizer and relieved of pressure, with a consequent instant reduction in temperature. It may be delivered directly into a vacuum chamber or evaporator, and its temperature promptly reduced, preferably to about 120 degrees F. By regulated evaporation the material may be concentrated to any desired degree. The temperature in the vacuum chamber or other receiver is not critical, although it should be kept low enough to avoid material thermo-chemical change during an interval long enough to allow the death points of the surviving spores to be materially reduced below that which they normally possess. A 10 minute period of dwell at 120 degrees F. may be found sufficient, although I prefer a period of dwell of about 30 minutes duration. Ordinarily a dwell for several hours will be permissible. The period of dwell at reduced temperature should not be long enough to permit recuperation or germination. Before germination commences I subject the material to a low sterilizing temperature ranging from about 210 degrees F. to 230 degrees F. for a period of about 10 minutes. For this purpose I may deliver the material through a surface heater, from which it may be passed directly into pre-sterilized containers, in which it may then be sealed. The containers, after sealing, may be kept hot for a brief interval and will then preferably be quickly cooled by immersing them in cold water.

Alternatively, the material may be delivered directly from the vacuum chamber into pre-sterilized cans, whereupon the cans may be sealed and passed through a heating medium to elevate their temperature and that of their contents to a point above the pasteurization range, preferably to a degree at or above 212 degrees F., and in some cases to about 230 degrees F., for a period of about 10 minutes. The temperature and time of such reheating are not critical, but for canned cream soups of the character above described I prefer to subject the sealed cans to a temperature of about 230 degrees F. for a period of about 10 minutes, for the double purpose of completing the sterilization and bringing about a thickening of the product to the desired consistency. If reheated in the can to a temperature as high as 240 degrees F. for about 10 minutes, some coagulation may be expected, but sterilization may readily be made complete without approximating a coagulating temperature.

If the material is not to be concentrated, it may be delivered directly from the tubular sterilizer into pre-sterilized containers without cooling below 212 degrees F. These containers may be sealed while the material is at that temperature and the containers subsequently additionally cooled and allowed to dwell at a temperature materially below 212 degrees F. for the above described period, ranging in duration from one half hour to several hours, whereupon the containers may be passed through a reheating passage or chamber and again brought to a temperature approximating 212 degrees F. or any boiling temperature below that at which the product might become coagulated.

As a representative example of my improved process and product, I have manufactured a sterile cream vegetable soup of normal density by mixing milk, various chopped vegetables, starch, spices, salt and other seasoning, the vegetables being generally chopped and mixed directly into heated milk to avoid oxidation and discoloration. Starchy material may be added for thickening purposes, the quantity being dependent upon the desired degree of thickening. This mixture is held hot and under agitation for a few minutes to give the vegetables time to soften. The temperature is kept below the boiling point at which normal quality milk will coagulate. After the vegetable material has been softened, the mixture is pumped into a steam jet sterilizer of the character above described and steam is injected in a sufficient volume and at sufficient temperature and pressure to instantly raise and momentarily maintain the temperature of the material at about 265 degrees F., after which the material is delivered directly to a filling machine of the closed type and which has been carefully sterilized preparatory to the delivery of the material thereto. This machine delivers the material into sterile cans, which are then sealed and passed through a body of water to cool them below a sterilizing temperature and below a temperature promotive of coagulation, preferably to a temperature of about 130 degrees F.

After a period of dwell, which ordinarily need be no longer than that incident to the canning and subsequent cooling process, these filled and sealed cans are reheated to a low sterilizing temperature for a short period. In practice they may be passed through a reheater of any ordinary type and held at a temperature ranging from 212 degrees F. to 230 degrees F. for approximately 10 minutes after the desired steam temperature has been attained in the reheating chamber. Then it will be desirable to immediately pass the cans through cold water to promptly reduce their temperature below that tending to promote thermo-chemical change, whereupon they are in condition for transportation or storage.

The final heat shock administered by reheating in the can (or preparatory to the canning operation), has been found to be effective even at temperatures ranging between 210 degrees F. and 230 degrees F. But in practice, I prefer to administer the major heat shock at a little above 260 degrees F. and the final heat shock at about 220 degrees F. if the material to be sterilized does not require close observance of minimums.

The phenomenon known as decline of death point cannot be fully explained at present. It appears to involve changes in permeability of spore capsules, and while the precise nature of these changes can perhaps be determined only by extensive research, there are certain known facts pertaining to this reaction which are of value in understanding its uses and limitations.

I have observed that spores of the highly resistant species, when placed in very small tubes, and subjected to a severe heating in a steam retort, undergo visible changes during and after cooling. Before heating and before removal from the retort, the spores are resistant to staining. After heating and removal from the retort, and by the time that they may be prepared for microscopic examination, which may be an interval of 10 to 15 minutes, the same spore suspension is observed to be penetrable to stain and the spore-volume will be found to have distinctly increased, thus indicating that these spores are permeable to water. Spores which show this change in permeability invariably show a lower thermal death point than those of the same character in a segregated portion of the same suspension.

It is a well known fact that ordinary retort sterilization of food products at or about 240 degrees F. or less does not materially lower the death point of any spores that survive, although some evidence has been found of a slight lowering of death point. I am therefore of the opinion that the chemical reaction of sterilization may involve as its first required step, a change in the condition of the capsule or membrane surrounding the spore, and that if this change is brought about quickly by a sudden and severe heating at a high temperature, such, for example, as a temperature in the vicinity of 265 degrees F., permeability of the spores follows, or at least certain changes which result in permeability may be brought about within a very brief interval of time and within a period of time too short for radical thermo-chemical change in the other substances composing the suspension.

Actual permeation may or may not be initiated during this brief interval of high temperature, but in any event, it proceeds or continues at low temperatures and under conditions permitting observation, whereby increasing susceptibility to stain and increasing size of the surviving spores may be witnessed and the decline in death point demonstrated by again heating the suspension to a low sterilizing temperature with resulting complete destruction of the spores.

The temperature and time factors are so interrelated, and the resistance of the spores is so variable, due to difference in species if not to differences in the character of the suspension, that it is impossible to say that any specific temperature is critical, or even to say that the maintenance of a given temperature for a specific period of time is critical. However, my experiments lead me to believe that for creamed-vegetable soups and similar liquid-form food products, practical considerations suggest that a range of temperature between about 260 degrees F. and about 275 degrees F. may be regarded as more or less critical for such food products, partly for the reason that the time interval may be so reduced as to avoid impairment of the food materials, and partly for the reason that these substances ordinarily contain spore-formers of an exceedingly high resistance.

But I have observed that in a total elapsed period from first heating to final cooling, such, for example, as a period of 60 minutes, I have been able to produce absolute sterility in products containing spores which could not be sterilized by an equal interval of time at a temperature of 240 degrees F. In fact, I believe that food products containing milk, and particularly food products containing milk and ordinary garden vegetable material, cannot be completely sterilized at 240 degrees F. without substantially destroying, or very materially impairing, the merchantability of the product.

All of the evidence which I have thus far been able to obtain indicates that if permeability of the spores is initiated, they thereafter lose their thermal resistance progressively for an interval of time which may be as short as 10 minutes, or possibly even less, and may in some cases be somewhat longer. The temperature most favorable to this increase in permeability and to permeation by water and other materials, does not appear to be particularly critical, although it may be directly responsive to reactions resulting from the change from maximum to a lower temperature, such as would heretofore have been thought to favor survival.

The permeation reaction and decline of death point is a reaction clearly differentiated from germination and one which heretofore has not been recognized, or at least the possibility of utilizing such a reaction for bringing about complete sterilization has not, to my knowledge, been recognized. Evidence that this reaction is differentiated has been acquired by the following experiments.

Using an aerobic spore suspension of high thermal resistance, I have produced the decline of death point in 15 to 30 minutes after a heat shock of 270 degrees F. and completely destroyed all surviving spores by a subsequent reheating not exceeding 230 degrees F. for a period of 10 minutes. I was not able to obtain any observable decline of the death point of these spores by any one of the following methods:

(a) By boiling one hour and then cooling,
(b) By heating with steam jets for five minutes at 230 degrees F.,
(c) By heating with steam jets 5 minutes at 240 degrees F.

All these treatments would kill vegetative bacteria but allow subsequent germination of spores. In the methods of intermittent sterilization heretofore followed, boiling for a period of 10 minutes and subsequent germination has been practiced, but so far as I am aware, complete sterilization has never been accomplished by such methods if highly resistant spore-formers are present.

Germination of spores can rarely be demonstrated as taking place within 15 hours, the shortest interval to my knowledge being 4 hours. My own measurements on the spore suspension used in these experiments showed partial germination in 17 hours and compete germination in 24 to 30 hours. A portion of the same suspension, when subjected to my process as above described, underwent such a decline of death point during the period of dwell at low temperature that complete sterilization was obtained by reheating for 10 minutes at 212 degrees F., the total treatment being completed in a period not exceeding 30 minutes.

With my improved process the decline of death point reaction appears to take place approximately 60 times as fast as the germination reaction, thereby indicating that it is a totally different reaction.

The effectiveness of my improved process is further evidence that the reaction is of an unusual and heretofore unknown character. Spores capable of surviving 60 minutes of heating at 240 degrees F. are relatively common, and cultures of such spores are often obtained for experimentation. But of the many species of highly resistant spores thus far tested no instance has yet been known of any spores surviving treatment in accordance with my process as above described, with an interval of 15 or 20 minutes of low temperature dwell between the maximum heat shock and the final heat shock, even though the final heat shock may be as mild as 212 degrees F. for a period of 10 minutes. However, some of the spore suspensions tested in this manner have been found to survive in commercially practicable retort sterilization processes as heretofore practiced, and these spores have heretofore been generally considered to resist complete sterilization if present in considerable numbers.

Among the products heretofore regarded as exceedingly difficult to sterilize and as impossible to sterilize without such impairment as to make sterilization impractical, but which may be readily sterilized by my improved process and if desired marketed in sealed containers, the following may be mentioned: creamed corn, creamed chicken or comminuated meats of various kinds, creamed garden vegetables, and in general, granular and semi-fluid foods and food product materials.

In the foregoing description, statements that certain temperatures are not critical are intended to mean that a considerable degree of variation is possible. The term "heat shock" is intended to refer to any sudden temperature rise to a degree capable of accomplishing sterilization of at least certain living organisms of low resistance. The terms "major heat shock" and "maximum heat shock" refer to the particular heat shock which is of sufficient severity to be followed by a decline in death point in the surviving spores when relieved of such high temperature, or when a temperature is restored which might ultimately permit of germination. The expression "period of low temperature dwell", is defined as a period during which a temperature is maintained which will not cause material thermo-chemical change within a few hours after the heat shock has been administered, and within which germination will not occur. In the appended claims the term "garden vegetables" refers to vegetables such as celery, onions, spinach, green corn, and other products of an ordinary vegetable garden, as distinguished from cereals and other farm products. The term "milk" includes natural milk, skim milk, cream and milk products generally, and the term "cream soup" includes heat treated preparations of garden vegetables with natural milk, skim milk and milk products generally.

I claim:

1. The process of manufacturing sterile liquiform food products, which consists in quickly heating the material to a momentary temperature ranging from about 220 degrees F. to about 240 degrees F., simultaneously dispersing the particles to stabilize them against coagulation and agglomeration, promptly cooling the material to arrest thermo-chemical and flavor change, again subjecting the particles substantially instantaneously to a temperature ranging from about 260 degrees F. to about 280 degrees F. for a few seconds and with substantial uniformity in temperature and time as to all particles, immediately reducing the temperature to again arrest thermo-chemical and flavor change, and then canning and subjecting the canned material to a low sterilizing temperature.

2. The process of sterilizing liquiform food products, consisting in utilizing jets of steam to drive a confined stream of the material through a heating zone at a substantially uniform particle temperature ranging from about 260 degrees F. to about 280 degrees F. within a period variable from about 10 seconds to about one minute in accordance with the stability of the material and the resistance of contained spores, then immediately cooling the material to arrest thermo-chemical and flavor change, and again subjecting it to a sterilizing temperature in excess of 212 degrees F. after a period of low temperature dwell of sufficient duration to allow a death point reaction of surviving spores and before germination of such spores.

3. The process of sterilizing liquiform food products containing highly resistant spore formers, consisting in driving a stream of said material and steam through a closed passage of small cross section at a temperature ranging from approximately 260 degrees F. to 280 degrees F. with substantially uniform time exposure of all the particles to such temperature for a period ranging from about 10 seconds to about one minute, then instantly reducing the temperature to arrest thermo-chemical and flavor change, and again subjecting the material to a sterilizing temperature after a period of dwell at a temperature normally permissive of incubation, ranging from about 10 minutes to several hours and before germination of surviving spores commences.

4. The process of manufacturing sterile canned cream soup, consisting in sub-dividing cooked vegetable material, mixing such material with milk, injecting steam to disperse the material and raise its temperature momentarily to about 230 degrees F., reducing the temperature to about 120 degrees F., maintaining it for a period of about thirty minutes, then subjecting the particles uniformly to a temperature ranging from 260 to 280 degrees F. for a few seconds, immediately reducing the temperature to arrest thermo-chemical and flavor change and permit reactionary reduction in the death point of surviving spores, then promptly canning and subjecting the canned material to a temperature of about 230 degrees F. for a period of about ten minutes.

5. The process of manufacturing sterile food products, consisting in sub-dividing vegetable material sufficiently cooked to permit maceration, mixing such material with milk, raising the temperature of the mixture momentarily to about 260 degrees F., reducing the temperature to arrest thermo-chemical and flavor change, and allowing the material to remain below a sterilizing temperature until the death point of surviving spores has materially lowered by reaction from said high temperature, then canning the material and, prior to recuperation and germination of such spores, submerging the cans in a liquid having a temperature ranging from about 220 F. to about 230 degrees F. for a period of about ten minutes after heat penetration of the cans.

6. The process of manufacturing sterile food products having the characteristics of cream soup, consisting in sub-dividing vegetable material, mixing and agitating such material with milk at a sufficient temperature to soften the masses of vegetable material and make their dispersion possible under steam jet pressure, utilizing jets of steam to drive said material through a closed passage at a temperature ranging from 260 to 280 degrees F. with uniform exposure of the particles to such temperature for a period of a few seconds, then immediately reducing the temperature to arrest thermo-chemical and flavor change, and again quickly heating the mixture to a sterilizing temperature for a short period after a dwell of sufficient duration to allow a reactionary reduction of the death point of surviving spores.

7. The process of manufacturing sterile food products, consisting in reducing food material substantially to a state of suspension, exposing all of the particles uniformly and momentarily to a temperature ranging from about 260 degrees F. to about 280 degrees F., then promptly reducing the temperature to arrest thermo-chemical and flavor change, maintaining the reduced temperature until the surviving spores have undergone a reactionary death point reduction, and then reheating the material prior to recuperation and germination of such spores to a temperature ranging between 212 degrees F. and 235 degrees F. for a period of about 10 minutes.

8. A food material sterilizing process, consisting in preparing a liquiform mixture of food materials, utilizing steam to drive such materials with substantially uniform particle speed through a closed passage of small cross section while maintaining a temperature of the mixture in said passage ranging from about 260 degrees F. to about 280 degrees F. with substantially uniform temperature and time of exposure of each particle to heat, then immediately reducing the temperature of the particles to arrest thermo-chemical and flavor change, and again subjecting the material to a sterilizing temperature after a period of low temperature dwell and while the surviving spores are subject to death point reduction.

GEORGE GRINDROD.